Oct. 12, 1954

I. GOODFELLOW 2,691,188

METHOD OF AND APPARATUS FOR MOLDING SHOE FORMS

Filed Nov. 28, 1950

Inventor:
Isaac Goodfellow
By his Attorney

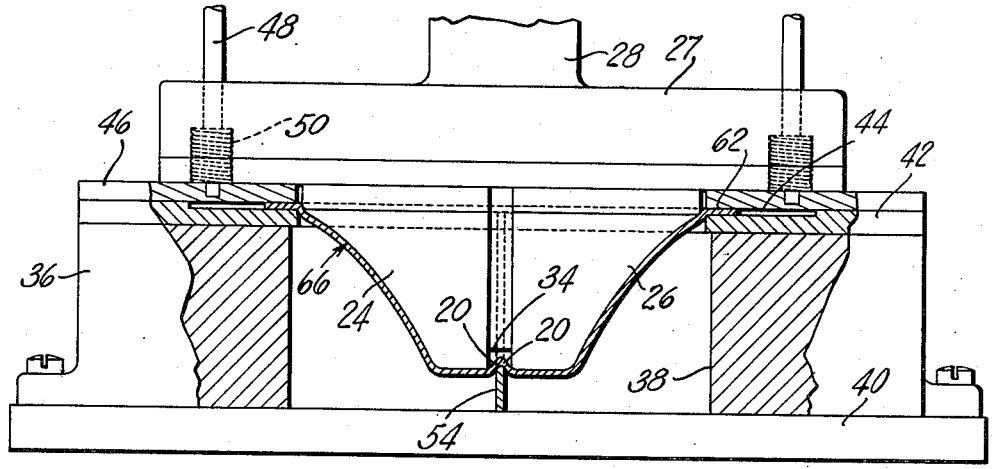
Fig. 4
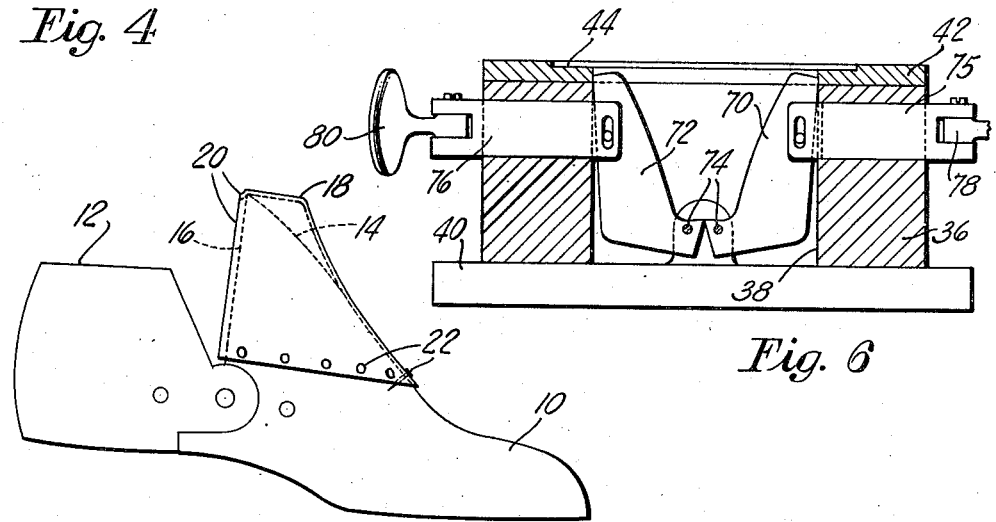
Fig. 6
Fig. 5
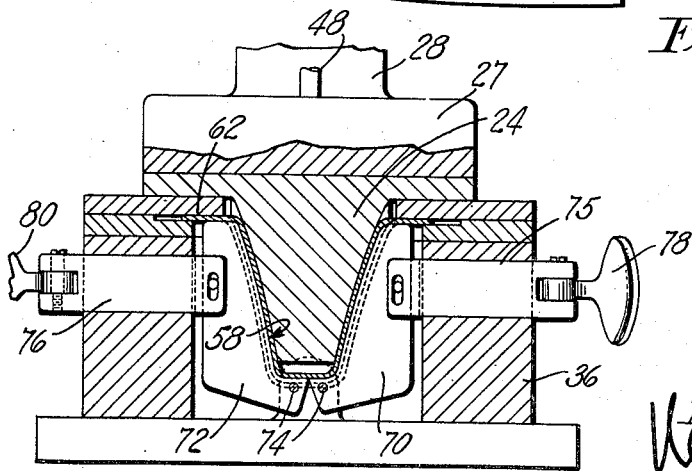
Fig. 7
Inventor:
Isaac Goodfellow
By his Attorney Patented Oct. 12, 1954

2,691,188

UNITED STATES PATENT OFFICE 2,691,188

METHOD OF AND APPARATUS FOR
MOLDING SHOE FORMS

Isaac Goodfellow, Auburn, N. Y., assignor to Shoe Form Co. Inc., Auburn, N. Y., a corporation of New York Application November 28, 1950, Serial No. 197,948

6 Claims. (Cl. 18—19)

1

This invention relates to molding shoe forms from sheet material and is herein illustrated as applied to the molding of a pair of forms at least one of which is simultaneously provided with an inwardly extending flange adjacent to the other form.

The increasing use of sheets of plastic material has brought about a considerable development in the ways of molding that material into desired shapes, usually of hollow articles. Among the articles so produced are forms used in connection with shoes such as those shaped like the toe end of a shoe and extending back along the shoe to varying distances. Various methods have been applied to the molding of such forms. One of these involves the application of coacting die members which engage opposite sides of the sheet. Another method involves the use of a cavity mold the inner face of which is shaped like the article to be produced and into which the sheet is expanded by fluid pressure. Still another method, which is employed in the present instance, consists in clamping the margin of the sheet and forcing against one face of it a molding member having the shape of the desired article. This effects the protrusion of the sheet and the wrapping of it around the molding member.

It has been previously suggested that, for economy of production, pairs of articles may be molded simultaneously by placing dual molding members in end-to-end relation and then, after the articles have been formed, cutting them apart.

An object of the invention is to provide an improved method of forming an inturned marginal flange substantially simultaneously with the molding of the article.

In one aspect, an article is molded by pressing the molding member against one side of said material and mechanically resisting the distention of the sheet along a margin of one face of the molding member to form an inturned flange on the article. As herein described, a notched plate is provided which coacts with the margin of a plane surface of the molding member to turn in the sheet material and thereby to form a marginal flange.

In another aspect, the method comprises causing relative movement between members engaging opposite sides of said sheet material to mold a pair of articles in spaced end-to-end relation and to form a flange from the material between the articles along an edge, of at least one of the pair of articles, which is adjacent to the other.

2

The known method of molding, which distends a sheet by pressing a molding member against one surface of a sheet which is clamped along its edges, is necessarily deficient because of its inability to bring the material into a concave portion of the molding member. The present invention is characterized, however, by its ability to draw the sheet material into such a concavity by a force which is applied to the material along an intermediate perimeter of the molding member at an area spaced from the concave surface. In the illustrative form of the method, the force which is applied to the sheet overlying the space between two forms is effective to draw the sheet material into the concave portions. Thus by a single stroke of the molding member in one direction a hollow body is formed which is provided with an inturned marginal flange and in which the material is drawn into a concave portion of the molding member.

Invention also resides in a novel apparatus which may be employed to carry out the method. This comprises means for gripping the margin of a sheet of material, a plunger carrying wedge-like molding members each having a bottom and sides and shaped like an article which is to be molded. These members are positioned in end-to-end relation thereon with an intermediate space. The apparatus also includes a notched plate positioned to cooperate with the other side of the blank along that intermediate space to turn back material into the space thereby to form marginal flanges on the articles when severed.

Additional control of the formation of the inturned flange, especially as to its depth, may be had by dividing the notched plate in two parts, each of which is pivotally mounted at the bottom end, and by providing means for forcing the upper ends of these plates into the space between the molding members to the desired depth. When thus implemented, the method includes an additional step which will usually take place after the completion of the down stroke of the plunger.

These and other features will best be understood from a consideration of the following specification taken in connection with the accompanying drawings, in which Fig. 1 is a plan view of the sheet holding portion of the apparatus, having parts broken away to show a cavity beneath that portion, said cavity being provided with a notched plate;

Fig. 4 is a side elevation of the structure shown in Fig. 3, broken away to show the plunger at its lowest point of movement;

Fig. 5 is a side elevation of a shoe last on which there has been mounted a hollow article formed by the above apparatus;

Fig. 6 is a view similar to Fig. 3 but without a plunger or a molding member, showing a modified form of apparatus in which the notched plate is divided into halves which are pivotally mounted and provided with means to press their upper portions into the space between the molding members; and Fig. 7 is a similar view but with the plates pushed in and the plunger depressed.

Figure 1:
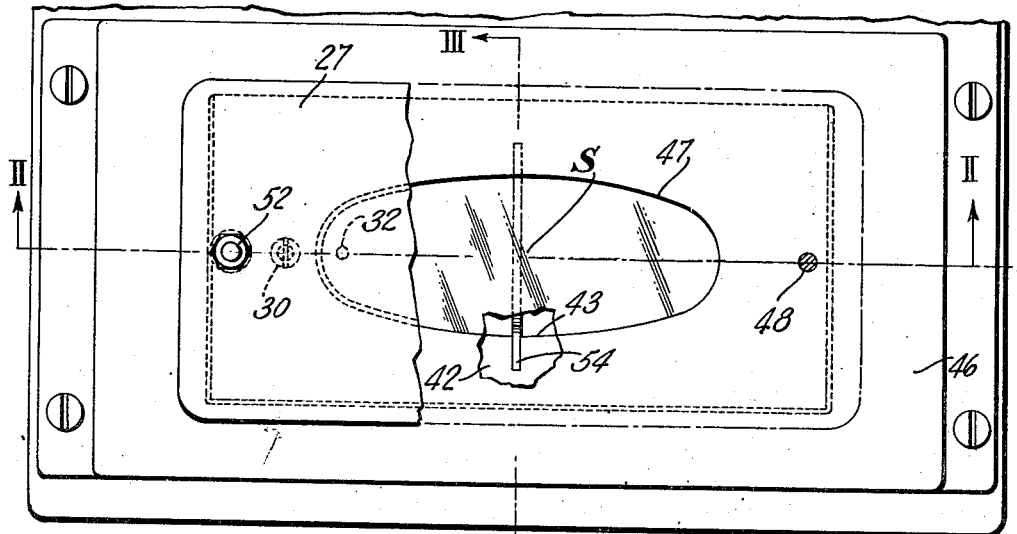

The apparatus for implementing the novel method is herein illustrated as arranged to mold a pair of similar articles, called "cone increasers," each of which is intended to be mounted upon the cone of the forepart of a last as, for example, when it is desired to manufacture cowboy boots upon a last intended for the making of oxfords. Thus there is shown in Fig. 5 a last having a forepart 10 and a heel part 12. A forepart cone 14 of this last has a plane rear surface 16. Mounted on this cone 14 is a cone increaser 18 shaped something like an inverted Cuban heel and provided with an inturned marginal flange 20 which overlaps the surface 16. The cone increaser is secured to the last by a series of tacks 22 driven through its lower margin.

In the apparatus two spaced male dies or patrix molding members 24 and 26 having adjacent plane surfaces, such as that at 25, are attached to a head 27 of a plunger 28 of a suitable press by screws 30 and dowels 32 (Fig. 2) and it will be seen that these molding members 24, 26, which in this case are identical, are mounted on the plunger in spaced, end-to-end relation. To obtain additional rigidity, the illustrated members are integral and a portion of the material in the space between them is cut away forming a deep groove 34 best seen in Figs. 2 and 4. The intersection of the plane surfaces 25 with the adjacent peripheral surfaces of the molding members form sharp corners around which the distended sheet is bent, as later described, to form the inturned flanges 20. When the members are pressed against the sheet material, pressure is applied along at least two marginal zones defined each on one side by the adjacent spaced edges of the members. One such zone is indicated by a stippled area 35 in Fig. 2.

Cooperating with these molding members is a block 36 having a straight sided cavity 38 shaped like the contour of the upper portion of two of the articles when they are placed in end-to-end, spaced relation. This block is mounted on a suitable base 40 and is provided with a top plate 42 slightly recessed as at 44 in Fig. 4 to a depth less than the thickness of the material to receive a sheet S. This supporting plate cooperates with a clamping plate 46 mounted on rods 48 passing through the plunger head 27 and surrounded with springs 50 pressing it against the sheet S so that the latter is gripped between the plates 42 and 46. The nuts 52 on the rods limit the separation of the head 27 and the plate 46.

Figure 3:
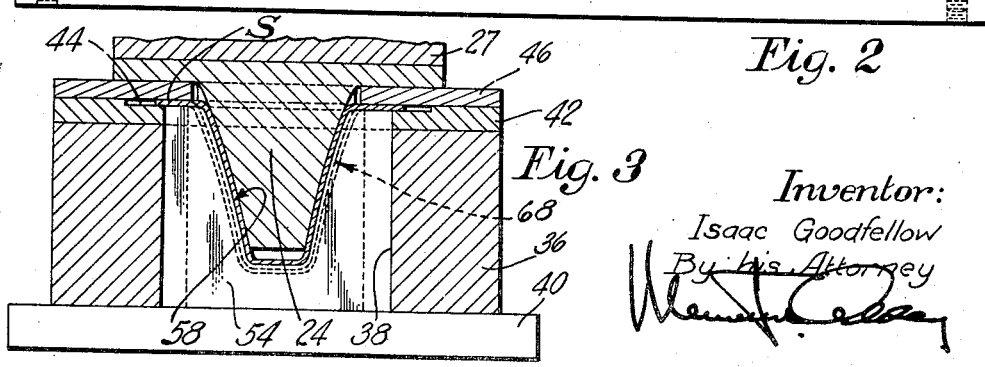
Fig. 3 is a transverse section on the line III—III of Fig. 1, showing the molding member substantially at the end of its downward stroke.

In the cavity 38 there is supported a plate 54 which, as may be seen from Fig. 3, is supported in slots in the cavity block 36. This plate has a notch 58 the contour of which is substantially like a cross section through the molding members at the bottom of said groove 34 and has downwardly approaching sides. The plate is taller than the molding members so that it will not be cut in half by the notch. The notch is slightly larger than the section through the groove to allow for the thickness of the material but is smaller than the adjacent outer periphery of the patrices. It will be noted that the width of the spacing between the molding members or the width of the groove 34 is substantially equal to the thickness of the plate 54 plus twice the thickness of the material S to be molded.

Figure 2:
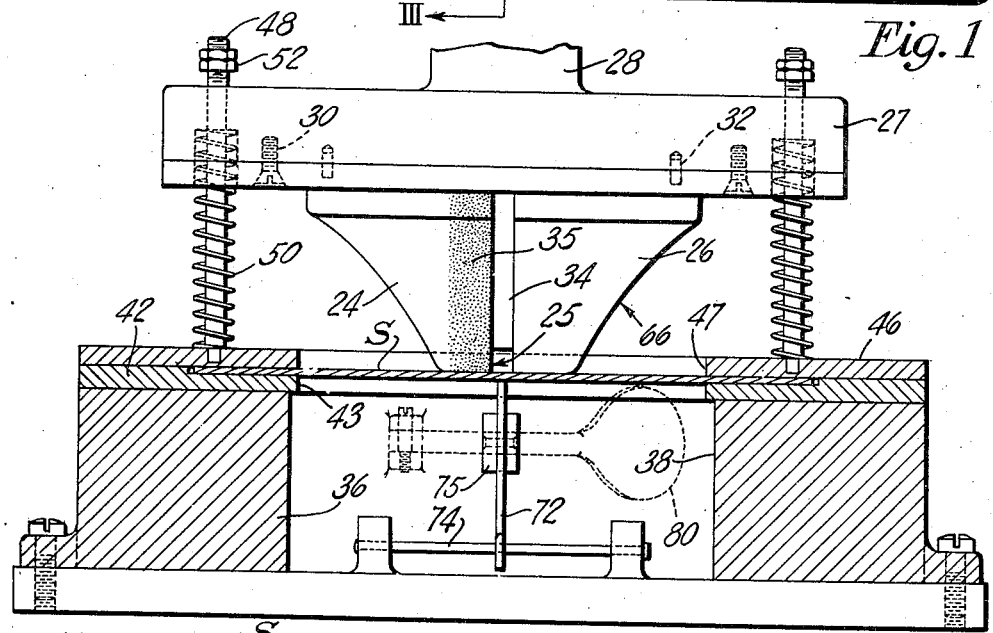
Fig. 2 is a side elevation of the plunger-mounted molding member with the said holding apparatus of Fig. 1 in longitudinal section on the line II—II of Fig. 1, showing the plunger just contacting with the upper surface of the sheet and modified to include a pair of notched plates.

In the modified form of the apparatus which is illustrated in Figs. 2, 6 and 7 the notched plate is divided into cooperating notched plates 70 and 72 mounted on pivot rods 74 extending longitudinally of the cavity 38, and when it is desired to control the depth of the flanges formed on the hollow articles, pressure is applied to a greater or lesser extent to these plate portions 70 and 72 by means of connected plungers 75 and 76 to the outer ends of which are secured levers 78 and 80 fulcrumed on the outside of the block 36.

In using this apparatus to carry out the method of the invention, a sheet S of a suitable stretchable material, such as one of the plastic materials commonly employed, is clamped around its margin between the upper plate 46 and the lower plate 42. It is well understood in the art that the sheet material is commonly prepared for the molding operation either by the application of heat and sometimes of moisture thereto or else by soaking it in a suitable solvent. The molding members and the plunger are then forced downwardly from the position of Fig. 2 to the position shown in Figs. 3 and 4 thus protruding the sheet to distend it and cause it to wrap around the molding members to assume their shape thus forming a partially shaped blank at the end of this step of the process which may be called a step product. Near the end of the stroke of the plunger the sheet material bridging the space between the molding members, herein illustrated by the groove 34, is brought against the notched plate 54 and turned back into that space in the manner illustrated in Figs. 3 and 4 to form a marginal flange 20 upon each of the forms when they are severed from one another. On the withdrawal of the plunger 28, the molded article is released from the clamping plates and the surplus flange 62 trimmed away. The two forms are then cut apart by severing the material between the flanged portions 20 leaving each article with an inturned marginal flange. The width of these flanges depends of course on the depth of the groove 34 and the design of the notch of the plate 54.

It will also be noted that the tensioning of the material along an intermediate perimeter of the male dies 24, 26 by the sides of the notch 58 in the plate 54 provides an additional stress in horizontal planes cutting through the articles to draw the material into such concavities as those shown at 66 in Fig. 4 or at 68 in Fig. 3.

When the method is to be employed for the manufacture of toe forms, for example, the molding members will commonly be shaped to represent a right and a left toe instead of being exactly similar as in the present instance.

The method may also be similarly carried out by the apparatus shown in Figs. 2 and 7 but will then usually involve the application of pressure to the levers 78 and 80 thereby to increase the depth of the flanges on the articles.

Having thus described my invention, what I claim as new and desire to secure by Letters Patent of the United States is:

1. The method of forming a hollow article which consists in forming a piece of sheet material over a male molding member having a portion of its surface concavely curved and drawing the material into said concave portion by force applied to the outer side of the material along an intermediate perimeter of the molding member at an area spaced from said concave surface.

2. The method of forming a marginal flange on a hollow article which consists in gripping the margin of blank sheet material, pressing against one side of said sheet a patrix substantially like two of said articles separated by an intermediate space to cause distention of the sheet and thereby to wrap it around the sides of the patrix, and thereafter moving against the sides of the other face of the sheet material a member thinner than the width of said space to push inwardly the portion of the sheet which bridges the parts of the patrix member thereby to form adjacent flanges which will, when the articles are severed, extend inwardly around an edge of each article.

3. An apparatus for forming hollow articles with a marginal flange, comprising means for gripping the margin of a sheet-like blank, a plunger at one side of said blank, said plunger carrying molding members shaped like a pair of said articles in spaced end-to-end relation leaving a narrow intermediate space, said molding members each having a bottom and sides, means for pressing said molding members against one side of the gripped blank to cause distention of the blank outwardly and thereby wrap it around the molding members, and a plate having a notch smaller than said members and positioned to cooperate with the other side of the blank along the bottom and sides of said intermediate space to turn the material into the space to form marginal flanges on the articles.

4. An apparatus for forming hollow articles with a marginal flange comprising means for gripping the margin of the blank, a plunger, at one side of said blank, shaped like a pair of said articles in spaced end-to-end relation leaving a narrow intermediate space, a pair of notched plates positioned to cooperate with the other side of the blank along said intermediate space to turn the material into the space, and means for forcing said plates inwardly to form marginal flanges on the articles.

5. An apparatus for forming a marginal flange on a hollow article, said apparatus comprising a block having a cavity as large as the contour of a pair of articles placed in end-to-end relation and spaced from one another, a plate taller than the articles and having a notch on its upper edge with downwardly approaching sides, said plate being supported at an intermediate point of said cavity, and a plunger having wedge-like molding members shaped like a pair of articles in spaced end-to-end relation, the spacing of said molding members being at least as great as twice the thickness of the blank material to be molded plus the thickness of the plate.

6. An apparatus for forming a marginal flange on a hollow article comprising means for gripping substantially the whole margin of a blank of sheet material, a molding patrix substantially like two of said articles in spaced relation, means for pressing said molding patrix against one side of said sheet to cause distention of the sheet outwardly and thereby to wrap it around the patrix, a thin member movably mounted for engagement with the other side of said sheet, and means for pressing that member against the portion of the sheet which lies between the parts of the molding patrix to distend that portion inwardly thereby to form adjacent flanges which will, when the articles are severed, extend inwardly around an edge of each article.

References Cited in the file of this patent

UNITED STATES PATENTS

| Number | Name | Date |
|---|---|---|
| 586,840 | Dover | July 20, 1897 |
| 637,372 | Cox | Nov. 21, 1899 |
| 900,276 | Geffers | Oct. 6, 1908 |
| 1,668,349 | Baum | May 1, 1928 |
| 1,860,683 | Meinel | May 31, 1932 |
| 2,255,117 | Helmstaedter | Sept. 9, 1941 |
| 2,260,667 | Hoof | Oct. 28, 1941 |
| 2,296,744 | Simmons | Sept. 22, 1942 |
| 2,332,926 | May et al. | Oct. 26, 1943 |
| 2,357,806 | Borkland | Sept. 12, 1944 |
| 2,425,390 | Palmer et al. | Aug. 12, 1947 |
| 2,451,794 | Balsam et al. | Oct. 19, 1948 |
| 2,484,656 | Sikka et al. | Oct. 11, 1949 |
| 2,530,043 | Borkland | Nov. 14, 1950 |
| 2,531,539 | Smith | Nov. 28, 1950 |